(12) United States Patent
Venolia

(10) Patent No.: US 7,971,179 B2
(45) Date of Patent: Jun. 28, 2011

(54) PROVIDING ARTIFACT LIFESPAN AND RELATIONSHIP REPRESENTATION

(75) Inventor: Gina D. Venolia, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1262 days.

(21) Appl. No.: 11/439,561

(22) Filed: May 23, 2006

(65) Prior Publication Data

US 2007/0277148 A1 Nov. 29, 2007

(51) Int. Cl.
 *G06F 9/44* (2006.01)
 *G06F 3/048* (2006.01)
(52) U.S. Cl. ........ 717/101; 717/110; 717/125; 717/105; 717/109; 715/763
(58) Field of Classification Search ................... 717/101
 See application file for complete search history.

(56) References Cited

U.S. PATENT DOCUMENTS

| | | | | |
|---|---|---|---|---|
| 6,026,362 | A * | 2/2000 | Kim et al. | 705/317 |
| 7,143,091 | B2 * | 11/2006 | Charnock et al. | 1/1 |
| 7,174,348 | B1 * | 2/2007 | Sadhu et al. | 1/1 |
| 7,421,660 | B2 * | 9/2008 | Charnock et al. | 715/751 |
| 7,539,943 | B2 * | 5/2009 | Vaidyanathan et al. | 715/744 |
| 7,735,068 | B2 * | 6/2010 | Siddaramappa et al. | 717/128 |
| 7,908,601 | B2 * | 3/2011 | Clemm et al. | 717/170 |
| 2002/0188597 | A1 * | 12/2002 | Kern et al. | 707/1 |
| 2004/0049518 | A1 * | 3/2004 | Billieux et al. | 707/102 |
| 2004/0153456 | A1 * | 8/2004 | Charnock et al. | 707/10 |
| 2005/0257136 | A1 * | 11/2005 | Charisius et al. | 715/511 |
| 2005/0289503 | A1 * | 12/2005 | Clifford | 717/101 |
| 2006/0200645 | A1 * | 9/2006 | Kumar | 712/1 |
| 2007/0143735 | A1 * | 6/2007 | Clemm et al. | 717/100 |
| 2007/0277148 | A1 * | 11/2007 | Venolia | 717/101 |

OTHER PUBLICATIONS

Kleinberg, "Authoritative sources in a hyperlinked environment", Year of Publication: 1999, Journal of the ACM (JACM), pp. 604-632, retrieved from <http://delivery.acm.org/10.1145/330000/324140/p604-kleinberg.pdf?key1=324140&key2=6505476721&coll=GUIDE&dl=GUIDE&CFID=91998899&CFTOKEN=51281491>.*
DeLine et al., Easing Program Comprehension by Sharing Navigation Data> Sep. 2005, Total pages, 8, retrieved from <http://citeseerx.ist.psu.edu/viewdoc/summary?doi=10.1.1.90.8373>.*
Čubranić et al. <Hipikat: A Project Memory for Software Development, Jun. 2005, pp. 446-465, retrieved from <doi.ieeecomputersociety.org/10.1109/TSE.2005.71 >.*
Williams et al. <Automatic Mining of Source Code Repositories to Improve Bug Finding Techniques, Jun. 2005, pp. 466-480, retrieved from <http://users.ece.utexas.edu/~perry/education/382v-s08/papers/williams.pdf>.*
Gina Venolia, "Bridges Between Silos: A Microsoft Research Project", Jan. 2005, retrieved from, <http://research.microsoft.com/pubs/74289/bridges-between-silos.pdf>, total pages: 10.*

(Continued)

*Primary Examiner* — Tuan Q Dam
*Assistant Examiner* — Marina Lee

(57) ABSTRACT

A system and method for providing artifact lifespan and relationship representation is disclosed. A timeline portion of a lifespan of at least two artifacts is provided. In addition, a relationship representation portion between the at least two artifacts is also provided. The timeline portion of the lifespan of the at least two artifacts and the relationship representation portion between the at least two artifacts is then combined at a ligature. A browser is then provided for displaying the ligature, wherein the browser is capable of adding, removing or editing the timeline portion and the representation portion of the ligature.

20 Claims, 6 Drawing Sheets

OTHER PUBLICATIONS

Matsushita et al., "CoxR: Open Source Development History Search System", Dec. 17, 2005, retrieved from <http://l3d.cs.colorado.edu/—yunwen/KCSD2005/>, total pages: 12.*

AB Banff, "Supporting the Social Side of Large Scale Software Development", Nov. 2006, total pages 76, retrieved from <http://research.microsoft.com/pubs/75413/sssIssdProceedings.pdf>.*

Helmick et al. "Incorporating Wikis Into Software Repository Mining", 2007, total pages 3, retrieved from <http://www.users.muohio.edu/helmicmt/papers/helmick_wikisym07.pdf>.*

Gina Venolia, "Textual Allusions to Artifacts in Software-related Repositories", 2006, total pages 4, retrieved from <ftp://ftp.research.microsoft.com/pub/tr/TR-2006-73.pdf>.*

"Representing Software Development Item Relationships Via a Graph", filed on Jul. 1, 2005 and assigned U.S. Appl. No. 11/175,568, 70 pages.

"Graph Browser and Implicit Query for Software Development", filed on Jul. 1, 2005 and assigned U.S. Appl. No. 11/175,570, 68 pages.

* cited by examiner

300

| Artifact 402 | Start Date 404 | First Reference Date 406 | last Reference Date 408 | End Date 410 |
|---|---|---|---|---|
| Email 215a | 5/02 | 5/02 | 11/02 | unk |
| Email 215b | 5/02 | 5/02 | 11/02 | 11/02 |
| Email 215n | unk | 8/02 | 12/02 | 12/02 |
| SCR 210a | 4/02 | 4/02 | 7/02 | unk |
| SCR 210b | unk | 5/02 | 10/02 | 10/02 |
| SCR 210n | unk | 9/02 | 12/02 | 12/02 |
| Meet 230a | 4/02 | 4/02 | 5/02 | 5/02 |
| Meet 230b | unk | 6/02 | 9/02 | 9/02 |
| Meet 230n | 11/02 | 11/02 | 12/02 | 12/02 |
| Bug 220 | unk | 6/02 | 10/02 | 10/02 |

```
┌─────────────────────────────────────────────────────────────┐
│ PROVIDE A TIMELINE PORTION OF A LIFESPAN OF AT LEAST TWO    │
│                        ARTIFACTS.                            │
│                          610                                 │
└─────────────────────────────────────────────────────────────┘
                              │
                              ▼
┌─────────────────────────────────────────────────────────────┐
│ PROVIDE AT LEAST ONE RELATIONSHIP REPRESENTATION BETWEEN    │
│               THE AT LEAST TWO ARTIFACTS.                    │
│                          620                                 │
└─────────────────────────────────────────────────────────────┘
                              │
                              ▼
┌─────────────────────────────────────────────────────────────┐
│ COMBINE THE TIMELINE PORTION OF THE LIFESPAN OF THE AT LEAST│
│   TWO ARTIFACTS AND THE AT LEAST ONE RELATIONSHIP            │
│   REPRESENTATION BETWEEN THE AT LEAST TWO ARTIFACTS INTO A   │
│                        LIGATURE.                             │
│                          630                                 │
└─────────────────────────────────────────────────────────────┘
                              │
                              ▼
┌─────────────────────────────────────────────────────────────┐
│ PROVIDE A BROWSER TO DISPLAY THE LIGATURE,WHE REIN THE      │
│ BROWSER IS CAPABLE OF ADDING,RE MOVING OR EDITING THE       │
│ TIMELINE PORTION AND THE AT LEAST ONE RELATIONSHIP          │
│ REPRESENTATION OF THE LIGATURE.                              │
│                          640                                 │
└─────────────────────────────────────────────────────────────┘
```

FIG. 6

PROVIDING ARTIFACT LIFESPAN AND RELATIONSHIP REPRESENTATION

BACKGROUND

The software development process leaves a vast trail of data behind it documenting the online activity of developers, testers, project managers, and other participants. The vast store of historical artifacts such as, old emails, bug reports, work items, check-in messages, specs, and the like, provide valuable, but mostly-untapped, resources for answering crucial questions about the project, such as, Why was this code written this way? Are there known problems in this code? Why did the build break? Why did this bug reach our customers?

Investigating questions like these are sometimes called sensemaking, which may be defined as "the process of searching for a representation and encoding data in that representation to answer task-specific questions". Sometimes the answers to the questions can be found in a single artifact. When this is the case a good search tool over the relevant store could help the user to find the crucial artifact. However it's common that the answer is spread across many artifacts in the data trail.

When the answer is not found in a single artifact, the user must then explore many artifacts, understand the relationships among them and piece together the answer from multiple bits of evidence. This suggests that a simple search tool is not enough. What is needed is a sophisticated interface for exploring a collection of related artifacts.

One solution that relies heavily on this kind of in-depth exploration of software artifacts is root-cause analysis, or RCA, which is the process of finding the reasons for failures in the software development process. I general, an RCA culminates in a report documenting the chain of events that contributed to the failure and suggesting solutions to prevent such failures in the future.

Normally, the framework that is used for the sensemaking process is a word-processor document containing a chronological list of artifacts related to the failure. In some cases, the document also includes text snippets from the artifacts and annotations interpreting the artifacts. In a typical RCA investigation chronology, there may be hundreds of entries in the document.

Deleteriously, the investigator discovers the source material by laboriously searching the repositories containing artifacts of potential interest. In many cases the process includes searching for keywords and phrases, peoples' names, the identifying numbers of key work items, knowledge-base articles, and builds. Moreover, each repository has its own unique search interface so this process is quite tedious.

Therefore, what is needed is a more efficient manner for sorting and investigating a repository of source material from a software development project.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A system and method for providing artifact lifespan and relationship representation is disclosed. A timeline portion of a lifespan of at least two artifacts is provided. In addition, a representation portion between the at least two artifacts and at least one relationship representation is also provided. The timeline portion of the lifespan of the at least two artifacts and at least one relationship representation between the at least two artifacts is then combined at a ligature. A browser is then provided for displaying the ligature, wherein the browser is capable of adding, removing or editing the timeline portion and the at least one relationship representation of the ligature.

DESCRIPTION OF THE DRAWINGS

The accompanying drawings, which are incorporated in and form a part of this specification, illustrate embodiments of the technology for providing artifact lifespan and relationship representation and, together with the description, serve to explain principles discussed below:

FIG. 4 is an exemplary artifact lifespan chart for providing artifact lifespan and relationship representation.

FIG. 6 is a flowchart of operations performed in accordance with one embodiment of the present technology for providing artifact lifespan and relationship representation.

The drawings referred to in this description should be understood as not being drawn to scale except if specifically noted.

DETAILED DESCRIPTION

Reference will now be made in detail to embodiments of the present technology for providing artifact lifespan and relationship representation, examples of which are illustrated in the accompanying drawings. While the technology for providing artifact lifespan and relationship representation will be described in conjunction with various embodiments, it will be understood that they are not intended to limit the present technology for providing artifact lifespan and relationship representation to these embodiments. On the contrary, the presented technology for providing artifact lifespan and relationship representation is intended to cover alternatives, modifications and equivalents, which may be included within the spirit and scope the various embodiments as defined by the appended claims.

Furthermore, in the following detailed description, numerous specific details are set forth in order to provide a thorough understanding of the present technology for providing artifact lifespan and relationship representation. However, the present technology for providing artifact lifespan and relationship representation may be practiced without these specific details. In other instances, well known methods, procedures, components, and circuits have not been described in detail as not to unnecessarily obscure aspects of the present embodiments.

Unless specifically stated otherwise as apparent from the following discussions, it is appreciated that throughout the present detailed description, discussions utilizing terms such as "receiving", "performing", "generating", "displaying", "selecting", "scrolling", "highlighting", "presenting", "testing", "identifying", "reporting", "prompting", "suppressing", "providing", and "refreshing" or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present technology for providing artifact lifespan and relationship representation is also well suited to the use of other computer systems such as, for example, optical and mechanical computers. Additionally, it should be understood that in embodiments of the present technology for providing artifact lifespan and relationship representation, one or more of the steps can be performed manually.

Example Computer System Environment

Figure 1:
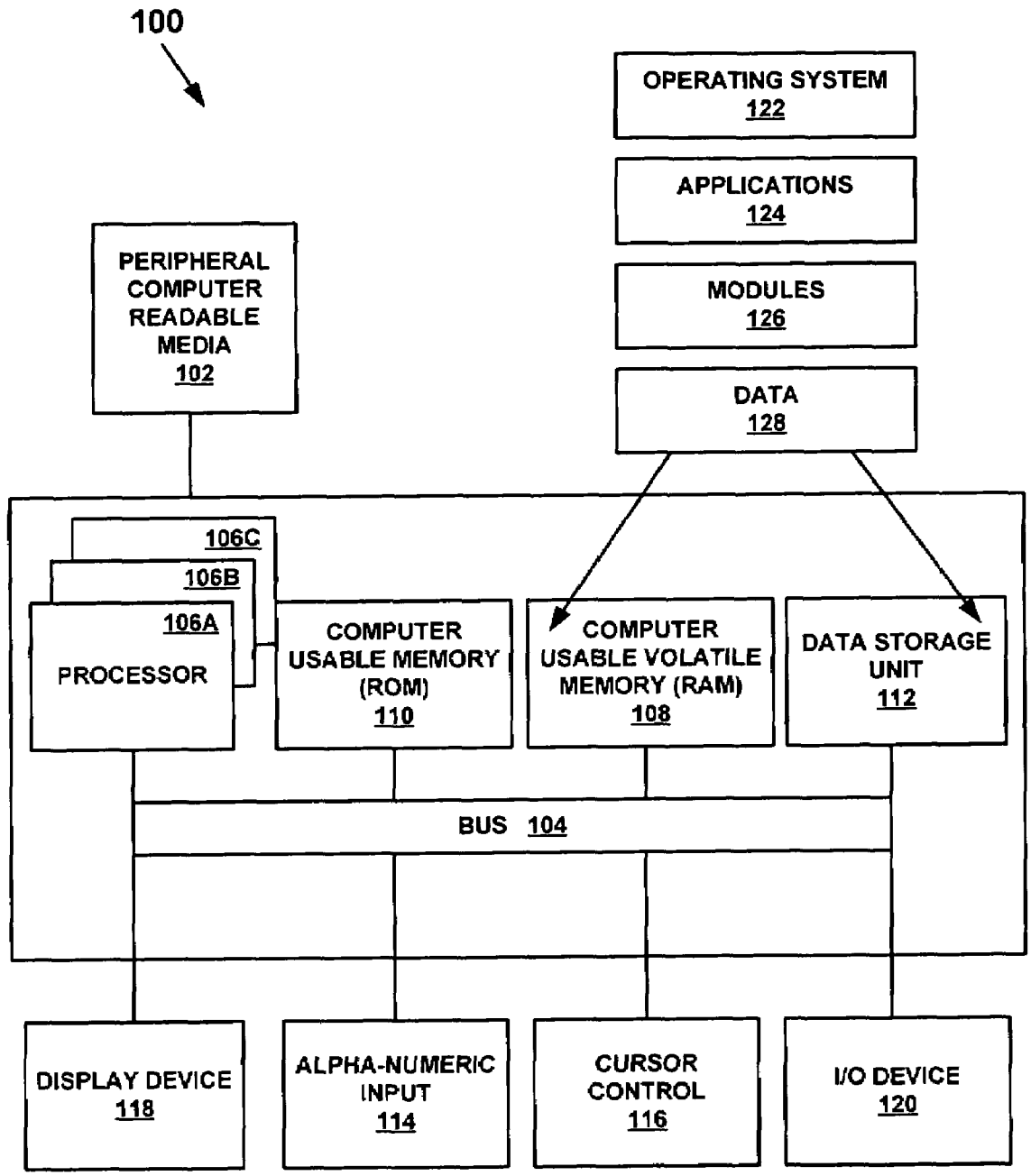
FIG. 1 is a diagram of an exemplary computer system used in accordance with embodiments of the present technology for providing artifact lifespan and relationship representation.

With reference now to FIG. 1, portions of the technology for providing artifact lifespan and relationship representation are composed of computer-readable and computer-executable instructions that reside, for example, in computer-usable media of a computer system. That is, FIG. 1 illustrates one example of a type of computer that can be used to implement embodiments, which are discussed below, of the present technology for providing artifact lifespan and relationship representation.

FIG. 1 illustrates an exemplary computer system 100 used in accordance with embodiments of the present technology for providing artifact lifespan and relationship representation. It is appreciated that system 100 of FIG. 1 is exemplary only and that the present technology for providing artifact lifespan and relationship representation can operate on or within a number of different computer systems including general purpose networked computer systems, embedded computer systems, routers, switches, server devices, consumer devices, various intermediate devices/artifacts, stand alone computer systems, and the like. As shown in FIG. 1, computer system 100 of FIG. 1 is well adapted to having peripheral computer readable media 102 such as, for example, a floppy disk, a compact disc, and the like coupled thereto.

System 100 of FIG. 1 includes an address/data bus 104 for communicating information, and a processor 106A coupled to bus 104 for processing information and instructions. As depicted in FIG. 1, system 100 is also well suited to a multi-processor environment in which a plurality of processors 106A, 106B, and 106C are present. Conversely, system 100 is also well suited to having a single processor such as, for example, processor 106A. Processors 106A, 106B, and 106C may be any of various types of microprocessors. System 100 also includes data storage features such as a computer usable volatile memory 108, e.g. random access memory (RAM), coupled to bus 104 for storing information and instructions for processors 106A, 106B, and 106C.

System 100 also includes computer usable non-volatile memory 110, e.g. read only memory (ROM), coupled to bus 104 for storing static information and instructions for processors 106A, 106B, and 106C. Also present in system 100 is a data storage unit 112 (e.g., a magnetic or optical disk and disk drive) coupled to bus 104 for storing information and instructions. System 100 also includes an optional alphanumeric input device 114 including alphanumeric and function keys coupled to bus 104 for communicating information and command selections to processor 106A or processors 106A, 106B, and 106C. System 100 also includes an optional cursor control device 116 coupled to bus 104 for communicating user input information and command selections to processor 106A or processors 106A, 106B, and 106C. System 100 of the present embodiment also includes an optional display device 118 coupled to bus 104 for displaying information.

Referring still to FIG. 1, optional display device 118 of FIG. 1 may be a liquid crystal device, cathode ray tube, plasma display device or other display device suitable for creating graphic images and alphanumeric characters recognizable to a user. Optional cursor control device 116 allows the computer user to dynamically signal the movement of a visible symbol (cursor) on a display screen of display device 118. Many implementations of cursor control device 116 are known in the art including a trackball, mouse, touch pad, joystick or special keys on alpha-numeric input device 114 capable of signaling movement of a given direction or manner of displacement. Alternatively, it will be appreciated that a cursor can be directed and/or activated via input from alphanumeric input device 114 using special keys and key sequence commands.

System 100 is also well suited to having a cursor directed by other means such as, for example, voice commands. System 100 also includes an I/O device 120 for coupling system 100 with external entities. For example, in one embodiment, I/O device 120 is a modem for enabling wired or wireless communications between system 100 and an external network such as, but not limited to, the Internet. A more detailed discussion of the present technology for providing artifact lifespan and relationship representation is found below.

Referring still to FIG. 1, various other components are depicted for system 100. Specifically, when present, an operating system 122, applications 124, modules 126, and data 128 are shown as typically residing in one or some combination of computer usable volatile memory 108, e.g. random access memory (RAM), and data storage unit 112. In one embodiment, the present technology for providing artifact lifespan and relationship representation, for example, is stored as an application 124 or module 126 in memory locations within RAM 108 and memory areas within data storage unit 112.

Overview

As an overview, in one embodiment, the present technology for providing artifact lifespan and relationship representation is directed towards a system for visualizing and browsing related and non-related project development artifacts. For example, after a project, such as a software development, is underway, a significant amount of information is generated. In general, the information can include emails, documents, versions of the computer program source code, groups involved, personnel involved, meetings, problems (e.g., work items) and the like. Each of these pieces of information is referred to herein as an artifact. For a plurality of purposes, including lessons learned, follow-on development and revision or bug error analysis/resolution, the information is usually stored in a historical repository. However, reviewing the stored information can be extremely time consuming.

In one embodiment, portions of the historical information in the repository are sorted by a graph data structure. Included in the graph data structure are directed relationship representations between related pairs of artifacts. Additionally, a lifespan for each artifact is provided. A ligature then combines the lifespan and relationship representation information for each artifact and provides the combination to a browser for presentation.

In general, the browser is capable of displaying a timeline visualization of the lifespan of the artifacts while also showing relationship representations among the artifacts. Moreover, in one embodiment, the browser is interactive. That is, the user can add to, modify or delete any relationship representations or artifacts from the present graph data structure display.

In so doing, the browser display described herein provides a visual timeline which can be navigated to a selected time period. Moreover, once a time period is selected, the user is able to recognize artifacts that are related to that particular time period, dismiss artifacts that have no relation to the specific time period, search the artifacts within the time period, and the like. In other words, the visualization is used to put artifacts in context using time and relationships between artifacts General Description of the Technology With reference now to FIG. 2 a block diagram of an exemplary system 300 for creating a ligature 358 utilizing a graph data structure 340 and lifespan definer 400 based on a plurality of disconnected data collections stored in a repository 330. Moreover, in one embodiment, the ligature 358 is provided in a visual format in a browser 500.

Figure 3:
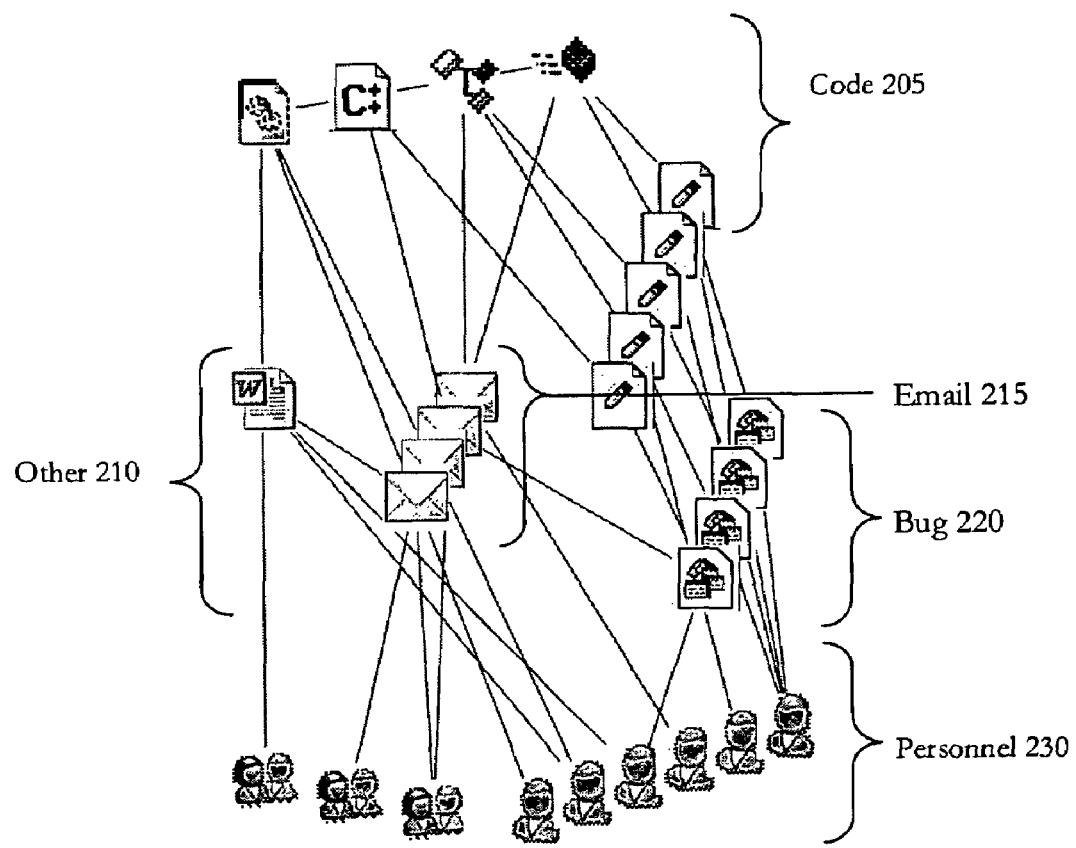
FIG. 3 is a diagram of an exemplary graph data structure in accordance with an embodiment of the present system for providing artifact lifespan and relationship representation.

As described in detail in the block diagram 300 of FIG. 3, the disconnected data collections in repository 330 can include an email database 210 (e.g., used by an email server to store the contents of emails and related information), a work item management database 220, a source code management database (e.g., 205), other data collections 210 (e.g., documents), or some combination thereof.

The graph data structure 340 can indicate relationships detected between various project development artifacts. For example, the graph data structure 340 can include relationships that are involved in a software development project related to, or discussed in, the disconnected data collections. The lifespan definer 400 is used to provide a lifespan of the artifact.

With reference now to FIG. 3, an exemplary graph data structure 340 is shown in accordance with one embodiment. In general, graph data structure 340 is a representation portion between at least two artifacts and at least one relationship representation. In other words, the graph data structure 340 is a graph of related artifacts where the relationship representations come from the structure of the source schema (e.g., code 205), the structured documents (e.g., email 215), groups and single users 230, a problem (e.g., work item 220), and other sources 210 (e.g., plain-text allusions).

In one embodiment, the artifacts in the graph data structure 340 are generated a portion of a variety of software development artifacts. Software development artifacts can include any identifiable artifact related to software development. For example, software development artifacts can include programming language constructs 205 such as object classes, methods, fields, structures, enumerated types, enumerated type constants, and the like. Although the terms link and relationship are used herein, for purposes of the present technology a relationship is a "real-world" entity, where a link is merely a representation of that entity in the index.

Software development artifacts can also include the developers 230 working on the software. Such developers 230 can be identified by a plain language name, a user name, or an email address or alias. Other software development artifacts can include artifacts tracked during the development process, such as software work items 220, code check-ins, changes to source code 210, software features, and the like.

Further, specifications or other documents 210 containing information on the software being developed can be included as software development artifacts. For example, files such as word processing documents, spreadsheets, slide shows, and the like can be software development artifacts. And, the locations of documents (e.g., file paths or URLs) can also be software development artifacts.

Also, emails 215 sent by a developer or containing information on any of the other software development artifacts can be software development artifacts and represented accordingly. Although software development is the example used herein, the graph data structure 340 may be used to support work domains and activities other than sensemaking.

In one embodiment, the data is collected using a plurality of data collection methods. In general, data collection can include any collection of data related to software development. In practice, such data collections can include an email database associated with communications between developers, a work item tracking database, an issue tracking database, a source code store, and other databases or data collections. In addition, one or more documents (e.g., word processing documents, spreadsheets, slide shows, and the like) can be a data collection.

A data collection can include structured information, unstructured information, semi-structured information, or some combination thereof. Further, a data collection can include plain text. Any data collection can serve as a source of information from which artifacts are created (e.g., by a graph builder tool) to represent the software development artifacts detected or mentioned therein.

Exemplary Relationships

In one embodiment, artifacts representing software development artifacts can be indicated as related, thus indicating a relationship between the represented software development artifacts. For example, a link, or relationship representation, can connect two artifacts to indicate that the two represented software development artifacts are related. Such an artifact may or may not indicate the type of relationship.

Examples of possible relationships include contains, mentions, received, sent, has a reply, authored, etc. Such relationships may be directed. A reverse direction may indicate a reciprocal relationship (e.g., contained by, mentioned in, received by, sent by, is a reply to, authored by, etc.)

Relationships can be between two different types of artifacts. For example, a software developer can be related to a software development artifact other than a developer. In addition, relationships can take the form of explicit relationships, implicit-but-exact relationships, ambiguous relationships (e.g., with an associated confidence score), textual relationships, and textual allusion relationships.

Relationships can be direct or indirect. For example, an email may directly indicate its sender and what was mentioned in the email. The sender is thus indirectly indicated as related to what was mentioned in the email. In this way, if two work items are mentioned by a same sender, the two work items are indirectly indicated related.

Exemplary Plain Text

In one embodiment, plain text can include any natural language text that is meant to be read by a human being. Examples of plain text include the text of emails, email subjects lines, notes fields, comments fields, description fields, and the like. Plain text can also be found in word processing documents, spreadsheets, slide shows, and the like. Mentions of software development artifacts (e.g., identifiers, names, and the like) can appear in plaintext documents. Upon detection of such mentions, a graph data structure can be updated (e.g., a relationship representation can be created) to indicate that the software development artifact was mentioned in a portion of the plain text.

In addition, in the software development context, plain text can appear in source code, work item descriptions, notes associated with source code check-ins, and the like.

In any of the examples herein, the technologies applied to plain text can also be applied to linguistic text, such as any text that is intended to be read by users in a natural language (e.g., English, Italian, Chinese, and the like).

Because a graph data structure can indicate the plain text mentions of software development artifacts, it is possible that two different software development artifacts are mentioned in the same portion of plain text (e.g., an email body). In such a case, two relationship representations (e.g., one for each software development artifact) may connect to a same artifact (e.g., representing the email) to the two software development artifacts to indicate that they were mentioned in the same portion of plain text. In this way, the two artifacts are indirectly related in the graph data structure. Such a relationship may be helpful when attempting to research either of the software development artifacts during development (e.g., to learn that the two development artifacts are somehow connected).

Exemplary Disconnected Data Collections

In any of the examples herein, two or more of the data collections can be disconnected. A disconnected data collection can include any data collection that is logically stored separately from another data collection. Separate storage can also be characterized by different formats for storing the data, different clients for accessing the data, different clients for searching the data, different clients for querying the data, a different protocol for accessing the data, or other heterogeneous characteristics. Such disconnected data collections are sometimes called "data silos" because the data is effectively shielded from full connectivity with data in other silos. For example, the application used with one data silo typically cannot access or query the data in another silo. Thus, one query cannot pull data from both silos. Email databases are typically disconnected from any other data collection. Thus, email and a non-email data collection are considered to be disconnected.

Examples of disconnected data collections include an email database and a work item tracking database; an email database and a source code management database; a source code management database and a work item tracking database; and a work item tracking database and an email database. A disconnected data collection can also take the form of one or more unstructured documents (e.g., a word processing document, a spreadsheet, a slide show, or the like).

Exemplary Techniques for Recognizing Software Development Artifacts

Although some of the examples herein are directed to recognizing software development artifact mentions, it is also possible to recognize the software development artifacts themselves. So, for example, when scanning source code in a data collection (e.g., a source code store), it is possible to recognize the definition of an object class. Accordingly, an appropriate relationship can be created (e.g., "contained in" to relate a method to a class or "defined in" to relate a definition to a source code file) responsive to such recognition. The following exemplary discussion provides an overview of graph data structure 340 methods for artifact relationship representation and evaluation described herein.

Exemplary Software Development Artifact: Email

In any of the examples herein, an email can be processed to detect software development artifacts and the relationships between them. For example, a graph builder tool can process (e.g., crawl) emails in an email database and add an artifact to the graph data structure to represent the email. Relationship representations can then be made from the artifact representing the email to artifacts related to the email, such as who sent the email and what was mentioned in the email.

TABLE a

Exemplary Software Artifacts in Email

| Artifact Detected | Software Development Artifact Action |
|---|---|
| Sender, recipient, cc recipient | Artifact ("sent," "received," etc.) for developer; link from email to developer |
| Mention of software development artifact in plain text (e.g., subject or body) | Artifact ("mentioned in") for software development artifact; link from email to artifact |
| Predecessor or successor message (e.g., forward, reply, reply all) | Link ("has reply," etc.) from email to other message |

Exemplary Software Development Artifact: Source Code Check-in

In any of the examples herein, a code check-in can be processed to detect software development artifacts and the relationships between them. For example, a graph builder tool can process a source code management system and add an artifact to the graph data structure to represent the code check-in. Relationship representations can then be made from the artifact representing the code check-in to artifacts related to the code check-in, such as who checked the code in and what was mentioned in the code check-in. Additionally, any changes to the code can be determined (e.g., via a compare), and such changes can themselves be treated as software development artifacts, which can in turn be inspected for detection of or mentions of software development artifacts.

TABLE b

Exemplary Software Artifacts in Code Check-in

| Artifact Detected | Software Development Artifact Action |
|---|---|
| Developer checking in | Artifact for developer; link ("checked-in") from check-in to developer |
| Mention of software development artifact in plain text (e.g., check-in notes or description) | Artifact for software development artifact; link ("mentioned in") from check-in to artifact |
| Source code change | Artifact for change; Process for detection or mention of software development artifacts; create links to change; also link from change to changing developer (e.g., the developer who checked in the related code) |

Exemplary Software Development Artifact: Work Item

In any of the examples herein, a work item can be processed to detect software development artifacts and the relationships between them. For example, a graph builder tool can process a work item tracking system and add an artifact to the graph data structure to represent the work item. Relationship representations can then be made from the artifact representing the work item to artifacts related to the work item, such as who opened the work item and what was mentioned in the work item report.

TABLE c

Exemplary Software Artifacts in Work item Report

| Artifact Detected | Software Development Artifact Action |
|---|---|
| Developer opening, closing, etc. | Artifact for developer; link ("opened," "closed") from work item to developer |
| Mention of software development artifact in plain text (e.g., work item notes or description) | Artifact for software development artifact; link ("mentioned in") from work item to artifact |

In any of the examples herein, a document (e.g., specification, design document, presentation, and the like) can be processed to detect software development artifacts and the relationships between them. For example, a graph builder tool can process a document and add an artifact to the graph data structure to represent the document. Relationship representations can then be made from the artifact representing the document to artifacts related to the document, such as who created the document and what was mentioned in the document.

TABLE d

Exemplary Software Artifacts in Document

| Artifact Detected | Software Development Artifact Action |
|---|---|
| Developer authoring, modifying, etc. | Artifact for developer; link ("authored-by") from document to developer |
| Mention of software development artifact in plain text (e.g., document contents or properties) | Artifact for software development artifact; link ("mentioned in") from document to artifact |

With reference now to FIG. 4, an exemplary artifact lifespan chart 400 is shown. In general, lifespan chart 400 is used to provide lifespan information to each artifact 402 in repository 330. In one embodiment, the lifespan chart 400 includes a start date 404, a first reference date 406, a last reference date 408 and an end date 410.

Start date 404 is a defined start or initialization date. For example, when an email is first drafted and sent is will have a start date. For example, email 215a has a start date of May 2. However, the start date is not always known or definite. In that case, the first reference date 406 is used to provide an initial date. For example, the second version of the source code revision (SCR) 210b does not have a defined start date but has a first reference date June 2. The lack of a start date may be due to missing information, a person or group working on a revision but not having a definite date that they started focusing on the new as opposed to working on the old revision, and the like.

In the same manner, the end date 410 is the last time that an artifact was utilized. For example, on June 2 the group (meeting 230b) was dissolved and the players reassigned. Thus, no more information will be provided by that particular group. However, if the artifact is an email, there may be no specific end date 410 and in that case, the last reference date 408 will define the end. For example, an email 215a may not have been referenced for a while and therefore has a last reference date of November 2. However, the email 215a does not have an end date 410 since it is still in a viable group and may still be being utilized.

Exemplary System

Figure 5:
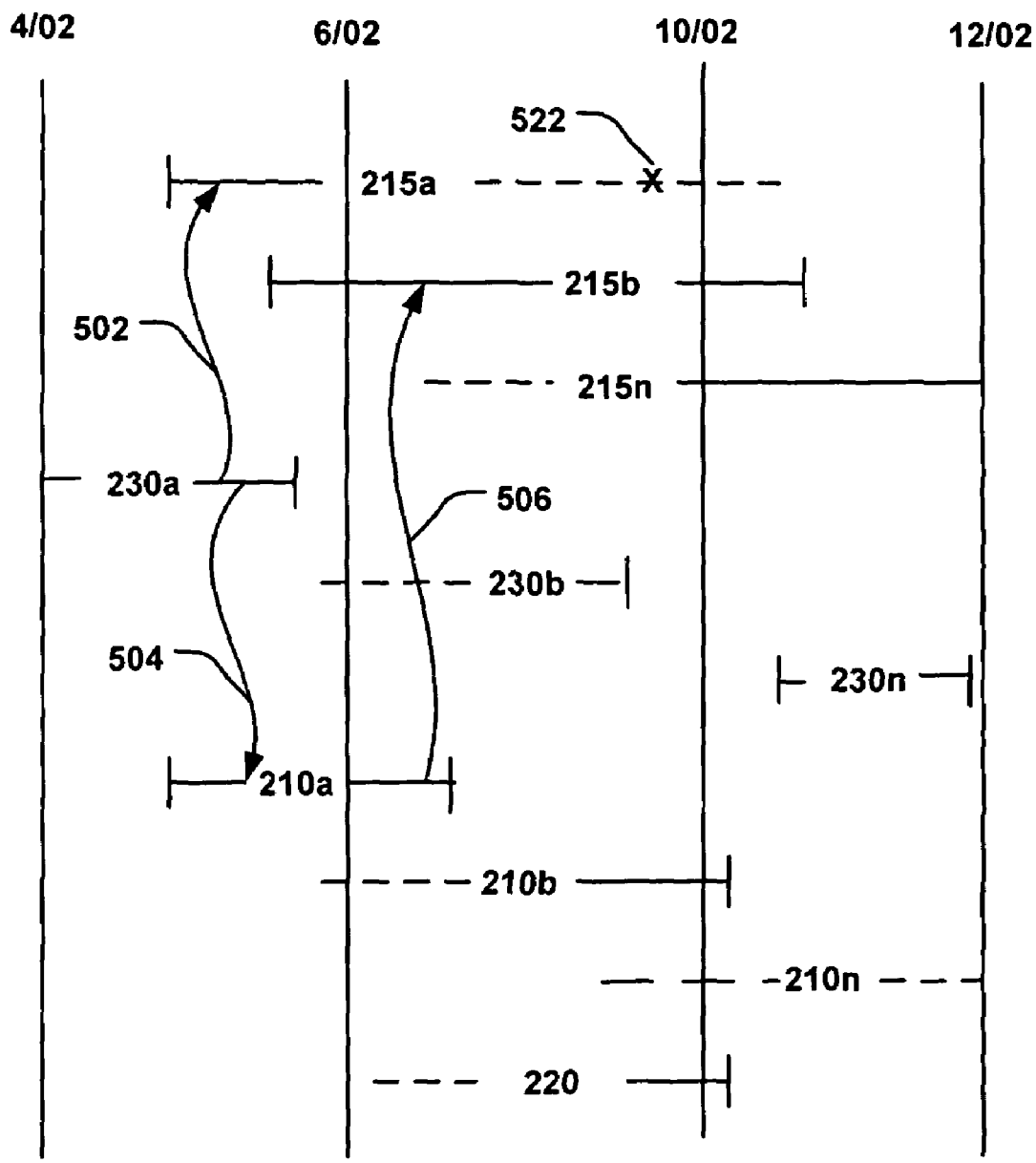
FIG. 5 is a graph of an exemplary browser of the present system for providing artifact lifespan and relationship representation.

With reference now to FIG. 5, a graph of an exemplary ligature browser 500 of the present system for providing artifact lifespan and relationship representation is shown. In general, browser 500 displays ligature 358. That is, the browser 500 utilizes a timeline visualization of the lifespan of each of the artifacts in the repository and shows the relationship representations among the artifacts. For example, artifact 230a has a lifespan of April 2 through May 2 and is related to artifact 210a via link 504 and related to artifact 215a via link 502.

In one embodiment, the start- and end-points of the link representing the related relationship in the browser are provided at the same moment in time, e.g., the same x position, because in one embodiment, a link represents a single moment in time. However, in another embodiment, the start- and end-points of the link representing the related relationship in the visualization are provided at the different moment in time, e.g., different x positions. In yet another embodiment, the start- and end-points of different links representing different related relationships in the visualization are provided in a combination of moments in time, e.g., some links in the same x position and some links having different x positions.

In one embodiment, the browser 500 is an interactive system that allows the user to manipulate a subset of artifacts. That is, although the browser 500 is shown to cover 8 months and includes only 10 artifacts, it is possible for the browser 500 to include many more artifacts and cover a lot larger of a lifespan. Therefore, in one embodiment, the browser 500 will also include navigation capabilities such as time search, scrollbars, scroll arrows, and the like to allow a user to navigate within the browser 500 to a specific time frame. Moreover, in one embodiment, the browser 500 will include a search feature to allow a user to narrow the search to specific types of artifacts (e.g., emails) and any other artifacts related thereto.

In another embodiment, the browser 500 allows the user to add or remove from the selected or shown artifacts. Moreover, the browser 500 is updateable based on new artifacts, changes in lifespan, user redefined artifact characteristics, annotation, search characteristics, and the like.

With reference now to FIG. 6, a flowchart 600 of operations performed in accordance with one embodiment of the present technology for providing artifact lifespan and relationship representation is shown. In one embodiment, the combination is displayed in a browser format wherein the browser is interactive with a user. That is, the user can search the browser, scroll the browser, edit the browser, or otherwise modify the view of the information generated during the combination of the artifact relationship with the lifespan timeline.

Referring now to 610 of FIG. 6 and to FIG. 4, one embodiment provides a timeline portion of a lifespan of at least two artifacts. In general, the utilization of an artifact timelines allows a user to sort and quickly find artifacts. That is, they allow the user to eliminate some hypothesized relationships among the artifacts. For example, email 215b did not discuss the work item 220 because their lifespans didn't overlap, and meeting 230n couldn't have inspired the initial meeting 230a because meeting 230a came first. Organization by time provides a natural framework for the sensemaking process, and allows narrative to be used as a sensemaking tool.

In one embodiment, the timeline portion 400 includes a start date 404 for the at least two artifacts 402 and an end date 410 for the at least two artifacts 402. However, in some cases, as described herein, the start date 404 or end date 410 may not be known or defined. In those cases, the timeline portion 400 includes a first reference date 406 for the at least two artifacts 402 defining the first time the artifact 402 is referenced. In another embodiment, the first reference date 406 may be inserted by a user. Additionally, the timeline portion 400 includes a last reference date 408 for the at least two artifacts 402 defining the last time the artifact 402 is referenced. In one embodiment, the last reference date 408 may be inserted by a user.

With reference now to 620 of FIG. 6 and to FIG. 3, one embodiment provides at least one relationship representation between the at least two artifacts and. For example, the graph data structure 340 provides a representation which can be recorded as a direct relationship representation between related pairs of artifacts such as personnel 230 and email 215. Because of the difficulties in detecting relationships in software artifacts, several complementary means are used herein. However, these methods are not inclusive but merely one of a plurality of ways of performing relationship detection provided herein for purposes of brevity and clarity.

In one embodiment, the at least one relationship representation is recorded from a source-code 205 control system related to the at least two artifacts. For example, the source-code 205 control system includes recording a check-in, the user that performed the check-in, the files affected by the check-in and the like. Other relationship representations can come from the content of structured files. For example, a source code file 205 may contain a class that contains methods which invoke other methods.

In yet another embodiment, the at least one relationship representation is recorded from an interpersonal message 215 related to the at least two artifacts. In general, the interpersonal message 215 is selected from the group of messages including: a work item message 220, an email message, a check-in message and the like. Oftentimes, the interpersonal messages 215 contain allusions to artifacts, e.g., "bug 220", "the account::Add method" or the like. The artifacts and relationship representations together form the graph 200.

Figure 2:
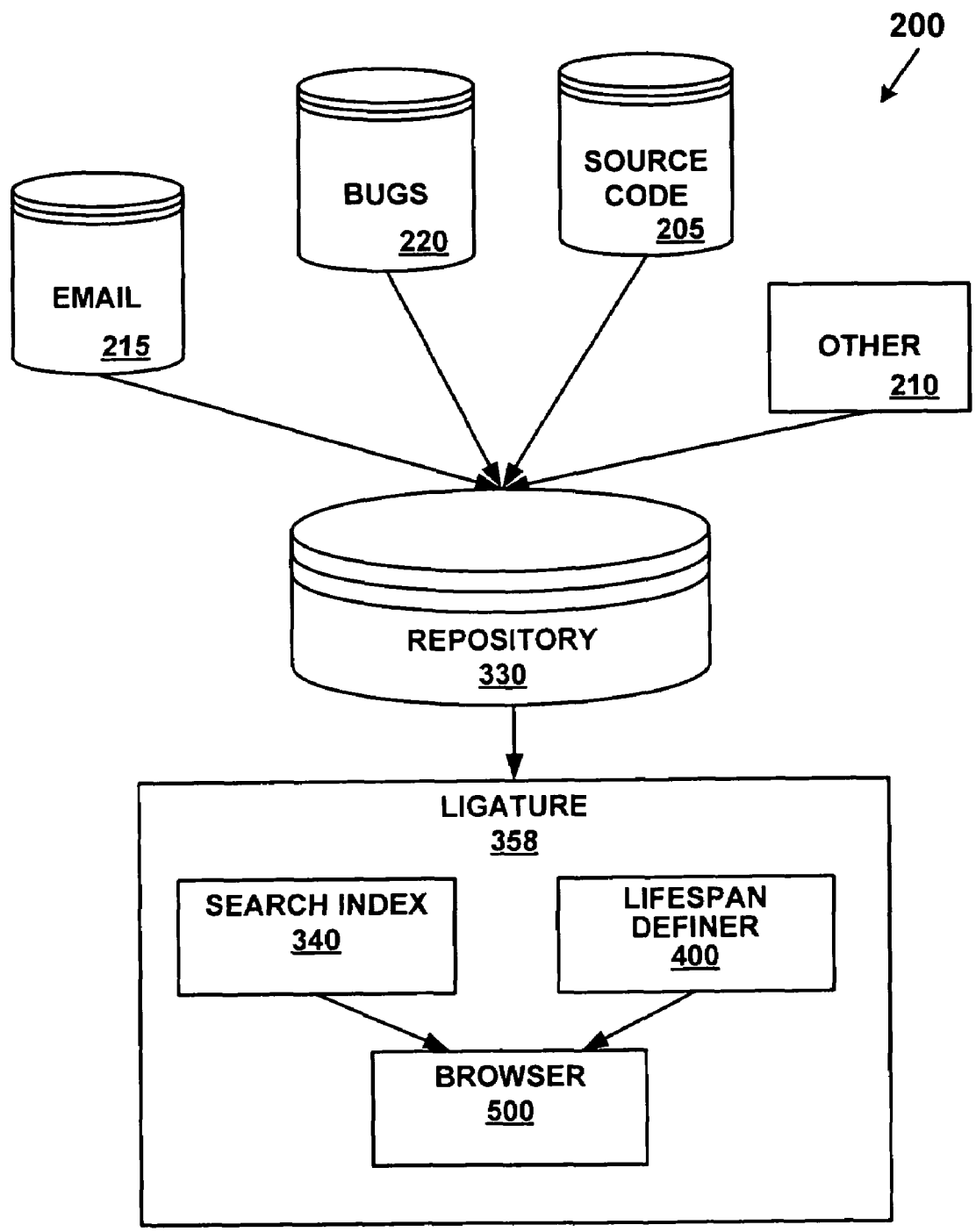
FIG. 2 is a block diagram of an exemplary system for creating a ligature based on a plurality of disconnected data collections stored in a repository of the present system for providing artifact lifespan and relationship representation.

Referring now to 630 of FIG. 6 and to FIG. 2, one embodiment combines, at a ligature 358, the timeline portion of the lifespan (e.g., lifespan definer 400) of the at least two artifacts and the representation portion (e.g., graph data structure 340) between the at least two artifacts and the at least one relationship representation. In one embodiment, the ligature 358 is provided in a user definable format. As described herein, in one embodiment the ligature is utilized to perform root-cause analysis of project development failure. However, the ligature 358 described herein is well versed for use in a plurality of other sensemaking domains.

With reference now to 640 of FIG. 6 and to FIG. 5, one embodiment provides a browser 500 to display the ligature 358, wherein the browser 500 is capable of adding, removing or editing the timeline portion 400 and the representation portion 340 of the ligature. In general, a browser 500 depicting ligature 358 uses a timeline visualization of the lifespans of artifacts and shows links (e.g., 502-506) among the artifacts as shown in FIG. 5.

In one embodiment, the timeline of an artifact lifespan is straightforward, looking much like table 400. However, given the possible size of the repository 330 only a tiny portion can be shown at once. Therefore, an interactive system that allows the user to manipulate a subset of artifacts is necessary. Thus, a browser 500 is utilized.

In one embodiment, the links (e.g., 502-506) are somewhat more complicated. Each link has a lifespan so relationship representations could also be rendered as a range of dates. However, in many cases this is unduly complicated, so a simpler visual representation is also available. For example, for purposes of simplification a relationship representation's birth is much more salient than its death, so a relationship representation is rendered as a moment in time. That is, in one embodiment, the relationship representation is provided in the form of a link rendered as a vertical line connecting two artifacts.

Moreover, in one embodiment, the link is shown as a line only if both artifacts it relates are visible. For example, if only one artifact is visible then a mark 522 may be placed on the artifact (e.g., 215*a*) to indicate the relationship representation. Taken together the marks 522 and links 502-506 indicate a pattern of activity for each artifact.

As described herein, relationship representations can also be directed. That is, the links can be rendered as straight lines with arrows. However, the resulting overlap, and the necessity for reading the arrowheads, suggests that an alternative representation of relationship representation direction may be more recognizable. Therefore, in one embodiment, the links (502-506) are curved into an S or reverse S shape.

In so doing, the direction and length of the link becomes apparent even if only a bit of it is visible. Also the overlapping of links is reduced. Although a number of relationship representation link options are described herein, the link may be any number of patterns, designs or structures. Moreover, in one embodiment, there can be a bunch of relationship representations happing at the same instant. One method for dealing with the plurality of relationship representations includes giving each visible link its own x position, and showing a gap in the background. Thus, the specific relationship representation descriptions provided herein are merely for purposes of brevity and clarity.

In one embodiment, browsing with the browser 500 is defined as the act of adding to or removing from the set of selected artifacts. One way to do that is by following relationship representations. For example, it may be reasonable to "expand" an artifact (e.g., 230*a*) by showing all the artifacts (e.g., 215*a*, 210*a*) related to it. However, the set of selected artifacts is not merely a transitory thing. That is, the hundreds of artifacts in the RCA investigation chronology are equivalent to the selected set, so it's valuable that the set be persistent and that the user can maintain multiple, independent sets. Thus, in one embodiment, to support the complete requirements of software development RCA the browser will include the ability to annotate artifacts and be integrated with a search UI.

Another method of navigating the browser 500 includes selecting a timeframe or importance. For example, if a user were researching work item 220, then a timeframe such as April 2 to December 2 may be initially selected as the timeframe of interest. Once the timeframe was selected, the browser 500 would show a portion or all of the artifacts that occurred during that time. As stated herein, the artifacts shown can be further restricted or enhanced by the user.

In the present example, the user would be able to look at the work item 220 and realize that it had no specific start date 404 (shown as the dotted line and no initial start point) but a first reference date 406 of approximately June 2. The user would also realize that the work item 220 was resolved and had a defined end date of approximately October 2 (shown as the solid line and T-section end point).

From the initial browser 500 view, the user would then be able to ascertain specific information about other artifacts, such as meeting 230*n* (which may represent a group, a person, or the like) did not have any part in fixing work item 220 since its start date 404 is after the work item's 220 end date 410. However, the meeting 230*n* may be of interest because the work item 220 may have been discussed. In one embodiment, if the meeting 230*n* was recognized as discussing the work item 220. Then a relationship representation could be added from the work item 220 to the meeting 230n to update the ligature and provide useful information to the next person reviewing the artifacts.

Therefore, it is clearly shown in browser 500 that by providing a viewable timeline and relationship representation structure, a user can receive an initial overview of places to look, objects that are related, and possible artifacts of interest merely by reviewing a specific artifact, a group of artifacts or a time frame. Moreover, because the browser 500 and underlying ligature 358 is editable, a first user performing a review can generate and save a distinct version of events which can then be easily reviewed by the next person performing a review. Thus, an investigation into the artifacts in a repository 330 does not result in a static piece of paper or report, but instead results in a browser 500 that is related, time-lined and openly available for review, analysis, adjustment and further evaluation by a second party. In addition, although software repositories are used as the example herein, software repositories are not the only things that can be mined in this way. Any graph, or object, with arcs representing moments in time or ranges in time is amenable to this visualization.

Thus, the present embodiments provide a method and system for providing artifact lifespan and relationship representation. In addition, embodiments described herein provide a method and system for providing artifact lifespan and relationship representation which includes a visual presentation in a browser. In so doing, the user can quickly evaluate artifacts and detect relationships between artifacts based on the lifespan of the artifact and the relationship representations between artifacts. This method significantly reduces the difficulty of the RCA process while significantly increasing the discovery of the desired artifact based on timeline and relation.

Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for displaying on a display of a computing device an artifact lifespan and relationship representation, said computer-implemented method comprising:
    displaying a plurality of graphic timelines of lifespans of corresponding artifacts, each with at least a lifetime start point, wherein positions of the graphic timelines relative to each other indicate chronological orders of the timelines relative to each other, wherein the timelines are displayed in a two-dimensional display area, wherein a first dimension thereof corresponds to time such that points on the timelines with a same position in the one dimension have a same time;
    displaying, with the graphic timelines, a plurality of graphic relationship representations representing relationships between corresponding pairs of artifacts, the graphic relationship representations graphically connecting corresponding pairs of graphic timelines; and
    providing a browser that performs the displaying, wherein said browser is capable of dynamically editing the displayed graphic timelines and the displayed graphic relationship representations.

2. The computer-implemented method of claim 1 wherein the artifacts represented by the graphic timelines comprise text files pertaining to development of a software product.

3. The computer-implemented method of claim 1 wherein at least one graphic relationship representation represents a relationship between a source-code control system document and an interpersonal message.

4. The computer-implemented method of claim 3 wherein the source-code control system document comprises a check-in document that includes information indicating a user that performed a source-code check-in and files affected by said check-in.

5. The computer-implemented method of claim 3 wherein said interpersonal message comprises either a work item, an email message, or a check-in message.

6. The computer-implemented method of claim 1 wherein a graphic timeline has a start point and end point corresponding to a start date and an end date of the lifetime of an artifact, the start date and end date having been automatically obtained by analysis of the artifact.

7. The computer-implemented method of claim 6 further comprising:
    providing a first reference date for the artifact when said start date is undefined; and
    providing a last reference date for said artifact when said end date is undefined.

8. Physical storage storing computer-readable instructions wherein the instructions when executed cause a computer system to perform a process comprising:
    automatically identifying lifespans of corresponding artifacts in a project development repository and identifying links between artifacts, where the lifespans and links are identified by analyzing content of the artifacts;
    displaying an interactive graphic representing artifacts as graphic timelines corresponding to the lifespans of the artifacts and representing the links as graphic links between the timelines, wherein the displaying is performed by a browser application, and wherein positions of the graphic timelines relative to each other indicate chronological orders of the graphics timelines relative to each other; and
    responding to user interaction with the interactive graphic via the browser application, wherein the responding comprises dynamically adding, removing or editing the displayed graphic timelines and the displayed graphic links of the interactive graphic.

9. The physical storage of claim 8 wherein at least one link further comprises: a link from a source-code control system that relates at least two artifacts, comprising:
    a check-in;
    a user that performed the check-in; and
    any files affected by said check-in; and
    at least one link from an interpersonal message related to said at least two artifacts.

10. The physical storage of claim 9 wherein said interpersonal message comprises either a work item, an email message, or a check-in message.

11. The physical storage of claim 8 wherein a timeline corresponding to the at least two artifacts comprises: a start date for said at least two artifacts; and an end date for said at least two artifacts.

12. The physical storage of claim 11, the process further comprising:
    providing a default first reference date for said at least two artifacts when said start date of said at least two artifacts is undefined; and
    providing a default last reference date for said at least two artifacts when said end date of said at least two artifacts is undefined.

13. The physical storage of claim 8, the process further comprising:
    panning said interactive graphic within a window responsive to the user interactions.

14. A method performed by a system comprising a processor and memory, the method comprising:
    accessing stored artifacts, each artifact comprising a digital document related to a subject, where each digital document is comprised of text related to the subject;
    performing automated analysis of the text of the digital documents to obtain lifetime information and link information, the lifetime information comprising information describing lifetimes of corresponding artifacts, the link information describing links between artifacts, the links having been discovered by automated analysis of the text of the digital documents to identify related digital documents, the lifetimes having been discovered by automated identification and analysis of date information in the digital documents;
    storing a graph data structure based on the link information, where links in the graph data structure correspond to the discovered links between artifacts, and where nodes of the graph correspond to the artifacts;
    storing a table comprised of the discovered lifetimes of the artifacts;
    based on the graph data structure and the table, generating and displaying a timeline graphic comprising chronologically arranged parallel line segments corresponding to the lifetimes of the artifacts, the timeline graphic also comprising graphic links connecting the line segments and corresponding to the discovered links between artifacts, wherein a graphic link between any two given line segments indicates the existence of a link between the artifacts corresponding to the line segments, the displaying performed in a browser that allows dynamic interactive editing of the timeline graphic.

15. A method according to claim 14, further comprising receiving user inputted commands and in response revising the graph data structure or graphically navigating the timeline graphic.

16. A method according to claim 14, wherein the artifacts comprise documents of a software product, emails having content about the software product, and source code files of the software product.

17. A method according to claim 14, wherein the displaying comprises executing a browser that responds to user input to navigate the timeline graphic.

18. A method according to claim 14, wherein, given a link between a given displayed timeline and an undisplayed timeline linked thereto, that link is represented by a graphic on the given timeline, the graphic not connecting the given displayed link and the undisplayed link.

19. A method according to claim 14, further comprising receiving a user-inputted query, and including in the timeline graphic only line segments of artifacts that satisfy the query.

20. A method according to claim 19, wherein the query comprises a date term, only line segments for artifacts having lifetimes that satisfy the date term are included in the timeline graphic.

* * * * *